(12) United States Patent
Guo et al.

(10) Patent No.: US 10,795,910 B2
(45) Date of Patent: Oct. 6, 2020

(54) ROBUST COMMUNICATION SYSTEM FOR GUARANTEED MESSAGE SEQUENCING WITH THE DETECTION OF DUPLICATE SENDERS

(71) Applicant: SYBASE, INC., Dublin, CA (US)

(72) Inventors: Yufei Guo, Waterloo (CA); Tim McClements, Waterloo (CA); Michael Thode, Waterloo (CA); Michael Vander Ploeg, Breda (NL)

(73) Assignee: SYBASE, INC., Dublin, CA (US)

( * ) Notice: Subject to any disclaimer, the term of this patent is extended or adjusted under 35 U.S.C. 154(b) by 574 days.

(21) Appl. No.: 14/145,246

(22) Filed: Dec. 31, 2013

(65) Prior Publication Data

US 2015/0186485 A1 Jul. 2, 2015

(51) Int. Cl.
  *G06F 16/27* (2019.01)
  *G06F 11/14* (2006.01)
  *H04L 29/08* (2006.01)
  *G06F 11/20* (2006.01)

(52) U.S. Cl.
  CPC .............. *G06F 16/27* (2019.01); *G06F 11/14* (2013.01); *G06F 11/2094* (2013.01); *G06F 11/2097* (2013.01); *H04L 67/1095* (2013.01); *G06F 2201/82* (2013.01)

(58) Field of Classification Search
  CPC .... G06F 17/30575; G06F 11/14; G06F 17/30; H04L 67/1095
  USPC ........................................................ 707/624
  See application file for complete search history.

(56) References Cited

U.S. PATENT DOCUMENTS

| | | | |
|---|---|---|---|
| 6,081,806 A * | 6/2000 | Chang | .................. G06F 16/275 |
| 6,487,560 B1 * | 11/2002 | LaRue | .................. G06F 16/27 |
| | | | 707/625 |
| 7,177,865 B2 | 2/2007 | Sasaki et al. | |
| 7,571,344 B2 | 8/2009 | Hughes et al. | |
| 7,853,961 B2 | 12/2010 | Nori et al. | |
| 8,380,663 B2 | 2/2013 | Thode | |
| 2002/0133507 A1 | 9/2002 | Holenstein et al. | |
| 2003/0167223 A1 | 9/2003 | Pledereder et al. | |
| 2008/0155525 A1 | 6/2008 | Ho et al. | |
| 2009/0300018 A1 | 12/2009 | Todd | |

(Continued)

FOREIGN PATENT DOCUMENTS

| | | | | | |
|---|---|---|---|---|---|
| EP | | 1244015 A2 | 9/2002 | | |
| WO | WO-2011/090599 A2 * | 12/2009 | ....... G06F 17/30575 | | |

(Continued)

*Primary Examiner* — Hosain T Alam
*Assistant Examiner* — Tracy M McGhee
(74) *Attorney, Agent, or Firm* — Sterne, Kessler, Goldstein & Fox P.L.L.C.

(57) ABSTRACT

Guaranteed message sequencing between a first and second database is described. An example method includes maintaining first state information associated with the first database at the first database, where second state information associated with the first database is maintained at the second database. The client sends, to the second database, a message describing changed rows between the first database and the second database since a last synchronization and the first state information. The client subsequently receives, from the second database, status of the last synchronization, where the status is determined by the second database based on the first state information and the second state information.

22 Claims, 6 Drawing Sheets

(56) References Cited

U.S. PATENT DOCUMENTS

| | | | |
|---|---|---|---|
| 2010/0103851 A1* | 4/2010 | Chintada | H04W 88/04 |
| | | | 370/312 |
| 2012/0036212 A1* | 2/2012 | McCarthy | G06F 17/30575 |
| | | | 709/206 |
| 2012/0207075 A1 | 8/2012 | Nagaraj et al. | |
| 2013/0298258 A1 | 11/2013 | Puri | |

FOREIGN PATENT DOCUMENTS

| | | | | |
|---|---|---|---|---|
| WO | WO-2011/090599 | * | 7/2011 | G06F 15/16 |
| WO | WO 2011/090599 A2 | * | 7/2011 | G06F 15/16 |
| WO | WO-2011090599 A2 | | 7/2011 | |

* cited by examiner

ROBUST COMMUNICATION SYSTEM FOR GUARANTEED MESSAGE SEQUENCING WITH THE DETECTION OF DUPLICATE SENDERS

BACKGROUND

Mobile applications in an "occasionally-connected" environment frequently store data locally to better ensure that their functionalities operate continuously when connectivity to the central server is lost. Data needs to be synchronized between the local data store on the mobile device and the consolidated data store on a central server. In the event that there are duplicated local data stores, where each contains requests to synchronize with the central server, the set of data changes corresponding to the requests need to be applied exactly once and in the exact order they are sent to avoid data corruption or data loss. Conventional systems often implement a chatty communication protocol to support data synchronization, which requires a client data store or a central server to wait for an acknowledgement before it can transmit again. However, such conventional systems generate excessive network latency and do not handle out of order communications. The problem is exacerbated in situations where the local data store is copied by backup processes or by users to multiple computers.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and sub-combinations thereof, for a robust communication system for guaranteed message sequencing with improved performance and data integrity. As will be described in further detail below, embodiments maintain synchronization state information both at the client side (e.g. a remote data store) and a server side (e.g. a consolidated data store). Embodiments can handle out of order communications originated from a remote data store. Embodiments can further handle communication failures at any stage of the synchronization between a remote data store and a consolidated data store. Embodiments use a unique identifier of the client and a small amount of sender-side and receiver-side state information to robustly prevent data corruption caused by unreliable networks or duplicated data stores. Accordingly, embodiments implement a non-chatty communication protocol, where changed rows are synchronized between the first database and the second database with a message describing the changed rows since the last synchronization.

Figure 1:
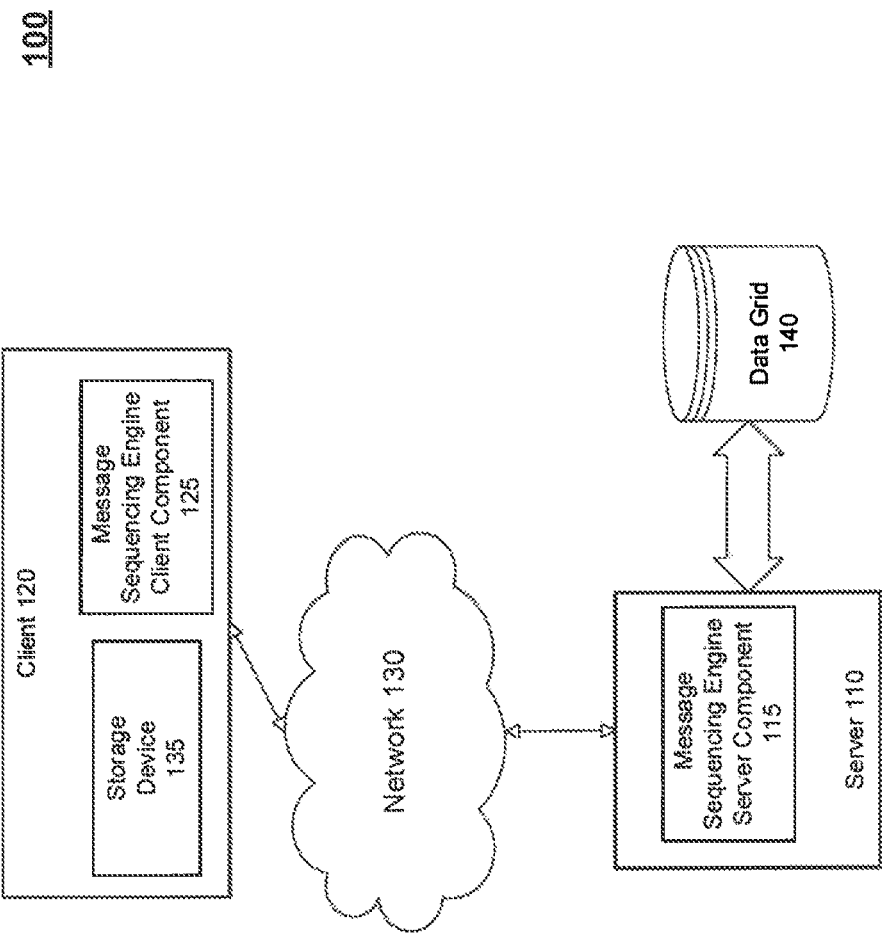
FIG. 1 illustrates a client/server system, according to an embodiment.

FIG. 1 illustrates a client/server system 100. System 100 includes a server 110, a server component of message sequencing engine (MSE) 115, a client 120, a client component of message sequencing engine (MSE) 125, a network 130, and a data grid or distributed database 140.

Client 120 communicates with server 110 over the network 130. Specifically, client 120 may be connected to a Database Management System (DBMS) (not shown) on server 110 via network 130. In an embodiment and without limitation, the DBMS may be Oracle®, Microsoft® SQL Server, MySQL, IBM® DB2 and may operate as an independent process (i.e., independently of the clients), running under a server operating system such as, but not limited to, Microsoft® Windows NT, Windows 2000, Windows XP, Windows Vista and Windows 7 (all from Microsoft Corporation of Redmond, Wash.), UNIX (Novell), Solaris (Sun), or Linux (Red Hat), although the invention is not limited to this example. The network 220 may include functionality for packaging client calls in the well-known Structured Query Language (SQL) together with any parameter information into a format (of one or more packets) suitable for transmission to the DBMS. Client 120 may send SQL statement to server 110 and receive query result from server 110. Although only one server 110 is shown, more servers may be used as necessary. Network 130 may be any network or combination of wired and wireless networks that carry data communication. Such network can include, but is not limited to, a local area network, medium area network, and/or wide area network such as the Internet.

Client 120 hosts a client component of MSE 125. An example of a client component of MSE 125 will be described in detail with respect to FIG. 2. Client 120 includes a storage device 135. Although only one client 120 is shown, more clients may be used as necessary. Storage device 135, an example of which will be described in detail with respect to FIG. 6, can be any device for recording and storing information, which includes but is not limited to, flash memory, magnetic tape and optical discs.

Server 110 can host Message Sequencing Engine (MSE) 115. As illustrated in FIG. 1, client 120 can send data requests to server 110, which can in turn invoke server component of MSE 115 for further processing. MSE 115 can be software, firmware, or hardware or any combination thereof in a computing device. System 100 can be implemented on or implemented by one or more computing devices. As will be further described with respect to FIG. 5, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2:
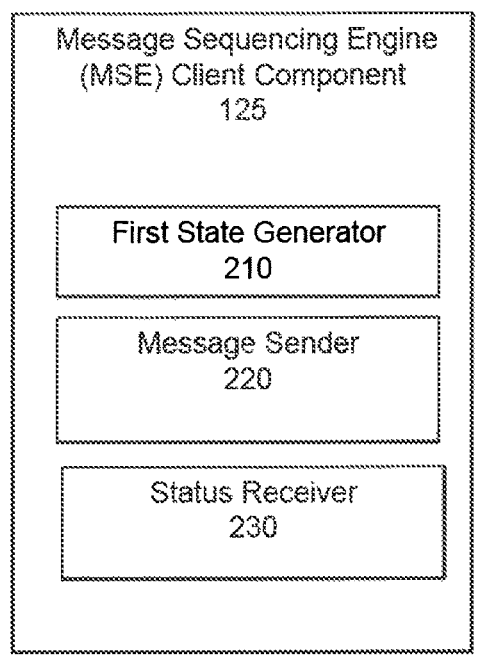
FIG. 2 illustrates elements of a client component of the message sequencing engine (MSE), according to an embodiment.

FIG. 2 illustrates elements of client component of Message Sequencing Engine (MSE), according to an embodiment. In the example shown in FIG. 2, client component of MSE 125 includes first state generator 210, message sender 220, and status receiver 230.

First state generator 210 maintains a first state information associated with the first database at the first database, while a second state information associated with the first database is maintained at the second database.

In one embodiment, the first database may be a remote data store residing on a client and the second database may be a consolidated data store residing on a server. For example, the first database may be a data store hosted on a mobile device. Due to the "occasionally-connected" nature of the environment, the mobile device frequently performs data synchronization of the changed rows from its local data store to the consolidated data store on the server. In another embodiment, the first database and the second database may engage in peer to peer communications.

In one embodiment, the state information maintained at the first database may include a unique identifier (GUID) of the remote local store on the client. For example, a REMOTE_ID, which is a unique identifier (GUID), may be used to refer to a unique client. REMOTE_ID may be used by the server for tracking state information of the client. REMOTE_ID may also be visible to an administrator to distinguish between different clients. In some embodiments, REMOTE_ID may be written to log files and displayed in administration tooling.

In one embodiment, the state information maintained at the first database may include a session identifier such as PREV_SID. PREV_SID may represent an identifier for a previous communication session. Prior to the beginning of the previous communication session, the client may generate a GUID and record it as a session identifier for the previous session. PREV_SID is updated when the client receives a confirmation from the server that the server has received the message associated with this session identifier CURR_SID.

In one embodiment, the state information maintained at the first database may include a session identifier such as CURR_SID. CURR_SID may be a session identifier for the current communications session. In a current session, before the client initiates communications, it generates a GUID session identifier and commits the value to persistent storage. The persistent CURR_SID may allow for recovery of the state information, in the event that the client program terminates before the fate of the communication between the client and the server can be resolved. For example, a power failure or program crash may occur while the data synchronization is ongoing.

In one embodiment, the state information maintained at the first database may include a flag such as LAST_MESSAGE_APPLIED to indicate whether the message originated from the client has been applied to the server. LAST_MESSAGE_APPLIED may contain a Boolean value true or false. A false value means that communication was broken before the server could reply with the fate of the last message sent by the client.

Message sender 220 sends, to the second database, a message describing the first state information and changed rows between the first database and the second database since a last synchronization. In an embodiment, the message describing the first state information may include the identifiers or flags maintained at the first database as discussed above.

Status receiver 230 receives, from the second database, status of the last synchronization, wherein the status is determined by the second database based on the first state information and the second state information. In one embodiment, if a synchronization request is generated from a duplicated first database, a synchronization error may be generated based on a comparison of the first state information and the second state information. In another embodiment, when an out of order synchronization request is generated from the first database, a synchronization error is generated based on a comparison of the first state information and the second state information.

Upon a determination that the last synchronization is free from a synchronization error, the changed rows are applied between the first database and the second database in a non-chatty communication protocol. In one embodiment, the changed rows are synchronized between the first database and the second database by applying the message describing the changed rows since a last synchronization.

In an embodiment, client component of MSE 125 may contain a status requestor, that sends a request to the second database to obtain status of the last synchronization, upon determination that the first state information indicates a synchronization error between the first database and the second database in the last synchronization. In another embodiment, status requestor may send an extra request to the second database to obtain status of the last synchronization when the first state information does not indicate the fate of the last synchronization.

Figure 3:
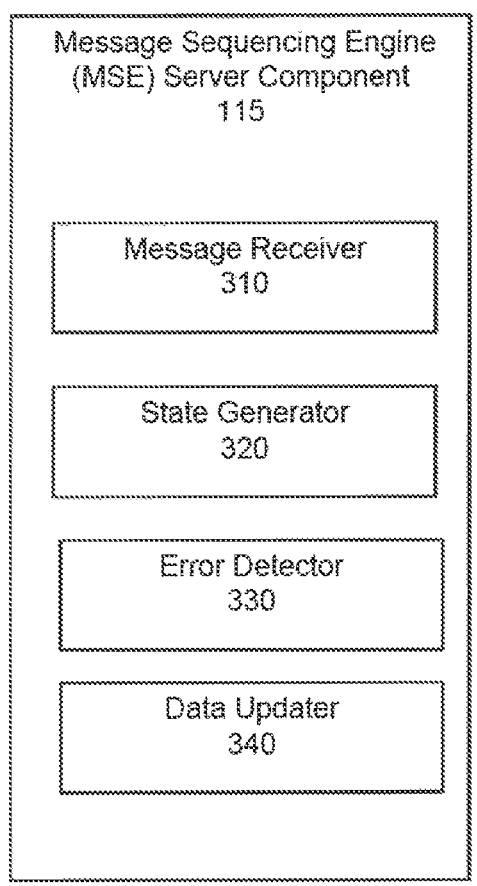
FIG. 3 illustrates elements of a server component of the message sequencing engine (MSE), according to an embodiment.

FIG. 3 illustrates elements of server component of Message Sequencing Engine (MSE), according to an embodiment. In the example shown in FIG. 3, server component of MSE 115 includes a message receiver 310, second state generator 320, error detector 330 and data updater 340.

Message receiver 310 is configured to receive a message describing first state information associated with a first database and changed rows between the first database and the second database since a last synchronization from the first database. In one embodiment, the first state information may include information such as a REMOTE_ID of an unique client, a PREV_SID, a CURR_SID, or a flag LAST_MESSAGE_APPLIED.

Second state generator 320 is configured to maintain a second state information associated with a first database at the second database. In one embodiment, as noted, the first database may be a remote data store residing on a client and the second database may be a consolidated data store residing on a server. In another embodiment, the first database and the second database may engage in peer to peer communications.

In one embodiment, the second state information generated or maintained at the second database may include a unique identifier (GUID) of the remote local store on the client, such as CLIENT_REMOTE_ID. In another embodiment, CLIENT_REMOTE_ID may be generated at the second database based on REMOTE_ID of an unique client contained in the first state information generated at the first database.

In one embodiment, the second state information may include a client session identifier such as CLIENT_SESSION_ID. In an embodiment, if a session is in progress, CLIENT_SESSION_ID may correspond to a current session identifier, such as the CURR_SID in the first state information. In another embodiment, if no session is in progress, CLIENT_SESSION_ID may correspond to a previous session identifier, such as the PREV_SID in the first state information.

In one embodiment, the second state information may include a flag indicating if the message originated from the client is applied in the session, such as CLIENT_MESSAGE_APPLIED. In an embodiment, in the event that the communication link is broken between a first database on the client and the second database on the server, the client may query this flag to determine if its last message was applied.

In one embodiment, when a client data store is first created, each of its state values in the first and second state information may be set to NULL. For example, the state value REMOTE_ID in the first state information generated at the client data store and the CLIENT_REMOTE_ID in the second state information generated at the consolidated store may be set to NULL. Alternatively, an administrator may assign a meaningful string to the REMOTE_ID or CLIENT REMOTE_ID. Still alternatively, if the REMOTE_ID or CLIENT_REMOTE_ID are left as NULL, a GUID may be generated automatically before the first synchronization between the client and the server. In an embodiment, the first synchronization is special because the PREV_SID is set to NULL.

Error detector 330 is configured to detect a synchronization error based on the first state information and the second state information. For example, a synchronization error is detected when a synchronization request is generated from a duplicated first database or an out of order synchronization request is generated from the first database. In one embodiment, the synchronization error may be detected based on a comparison of the first state information and the second state information. For example, a server detects that a client with a GUID CLIENT REMOTE_ID communicates with the server. In the event that the server determines that a second client attempts to connect to the server with the same CLIENT_REMOTE_ID, a synchronization error may be detected because the request is originated from a duplicated database. In another embodiment, based on the comparison of the state values in the first state information and second state information, an out of order synchronization request may be detected. For example, the comparison may be based on the second state information, which includes state values such as the CLIENT_SESSION_ID and CLIENT_MESSAGE_APPLIED and the corresponding first state information, which includes state values such as CURR_ID, PREV_ID, and LAST_MESSAGE_APPLIED for the same client.

Upon a determination that a synchronization is free from synchronization error, data updater 340 is configured to apply the changed rows between the first database and the second database. In one embodiment, the synchronization is performed in a non-chatty communication protocol, where changed rows are synchronized between the first database and the second database with a message describing the changed rows since a last synchronization.

In one embodiment, the changes made to the local data store are correctly applied to the consolidated data store. An insert/update/delete of a row in a local data store may be applied to the consolidated exactly once. Data loss may occur if the row is not applied to the consolidated store and data corruption may occur if the row is applied more than once.

In one embodiment, some mobile networks have high latency which can greatly impact the performance of data synchronization. To minimize the impact of a high latency network, a non-chatty communications protocol may be applied. For example, in a non-chatty communication protocol, there are as few exchanges of information as possible and the amount of time one party waiting for the other party to respond is minimized. In the absence of error conditions, the client robustly performs a synchronization with a single message from the client describing changes in the client data store since the last synchronization. Likewise, a single message may be sent from the server to the client describing changes to the server data store since the last synchronization. Embodiments of the elements of client component of MSE 125 and server component of MSE 115 in FIGS. 2 and 3, as described herein, may run in parallel for communications between the client local store and the server consolidated store. Such parallel execution of these elements would increase the efficiency and speed of system 100.

Figure 4:
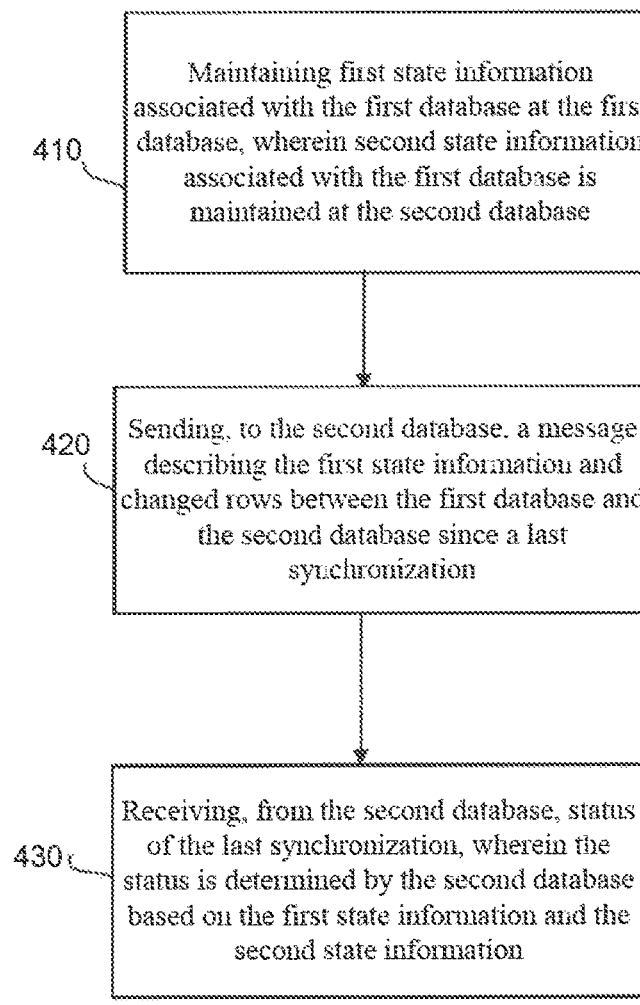
FIG. 4 is a flowchart for a method for guaranteed message sequencing with detection of duplicated senders, according to an embodiment.

FIG. 4 is a flowchart for a method for guaranteed message sequencing with detection of duplicated senders, according to an embodiment. For ease of explanation, method 400 will be described with respect to MSE 125 in FIG. 2, as described above. However, method 400 is not limited thereto.

At stage 410, a first state information associated with the first database is maintained at the first database, while a second state information associated with the first database is maintained at the second database. For example, first state generator 210 maintains a first state information associated with the first database at the first database.

At stage 420, a message describing the first state information and changed rows between the first database and the second database since a last synchronization is sent to the second database. At stage 430 the status of the last synchronization is received from the second database, where the status is determined by the second database based on the first state information and the second state information. In an embodiment, the status of the synchronization is determined by the second database based on the first and second state information, and a synchronization error is generated when a synchronization request is generated from a duplicated first database or an out of order synchronization request is generated from the first database based on a comparison of the first state information and the second state information. For example, status receiver 230 receives the status of the synchronization between the client local store and the server consolidated store.

In an embodiment, upon a determination that a synchronization is free from synchronization error, the synchronization is performed with a non-chatty communication protocol, where changed rows are synchronized between the first database and the second database with a message describing the changed rows since the last synchronization.

In one embodiment, upon a determination that a synchronization is free from synchronization error, the synchronization is performed with a non-chatty communication protocol, where changed rows are synchronized between the second database on the server and the first database on the client, with a message describing the changed rows in the second database since a last synchronization. In one embodiment, the changed rows are discarded upon determination the status indicating the synchronization error. In one embodiment, upon determination that the first state information indicates a synchronization error between the first database and the second database in the last synchronization, the client may send a request to the second database to obtain status of the last synchronization. For example, if the first state information indicates that CURR_SID is not NULL, this may indicate the fate of the last synchronization has not been resolved due to a communications error, so the client does a status-check. In one embodiment, the client may send parameters such as REMOTE_ID, PREV_SID, CURR_SID to the server and request a status check.

In one embodiment, the first database is an embedded data store on a client, and the second database is a consolidated data store. In another embodiment, the first database and the second database engage in peer to peer communication.

In one embodiment, the first state information and second state information include unique identifiers (GUIDs) associated with the first database and session information. In another embodiment, the first state information includes a unique identifier (GUID) associated with the first database, a current session identifier for a current communication session, a previous session identifier for a previous communication session, and a flag indicating whether a response has been received from the second database indicating that a last message with the changed rows from the first database has been applied to the second database, where the previous session identifier and the current session identifier are unique identifiers (GUIDs) generated on the first database.

In one embodiment, the second state information includes a unique identifier (GUID) associated with the first database, a session identifier which is associated with a current session if the current session is in progress or a previous session if no current session is in progress, and a flag indicating whether a last message with the changed rows from the first database has been applied to the second database in a session associated with the session identifier, where the session identifier is a unique identifier (GUID) generated on the first database and transmitted to the second database. In still another embodiment, the first state information may be sent to the second database to update the second state information as the synchronization proceeds.

Figure 5:
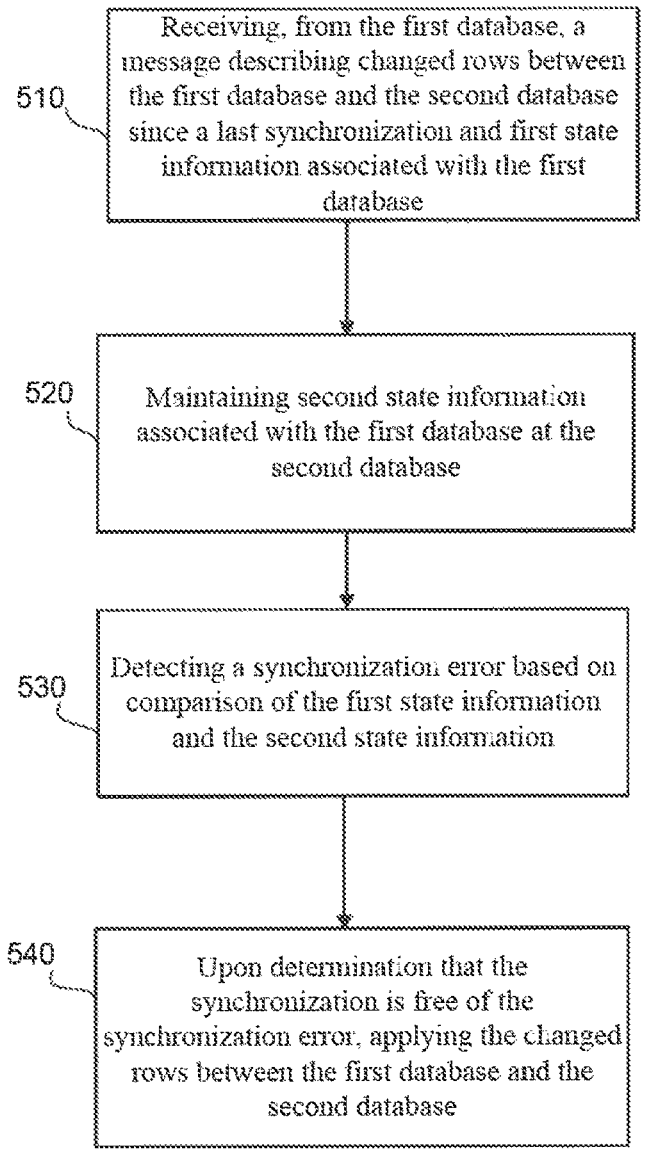
FIG. 5 is a flowchart for a method for guaranteed message sequencing with detection of duplicated senders, according to another embodiment.

FIG. 5 is a flowchart for a method for guaranteed message sequencing with detection of duplicated senders, according to another embodiment. At stage 510, a message describing first state information associated with the first database and changed rows between the first database and the second database since a last synchronization is received from the first database. For example, message receiver 310 receives the first state information associated with the first database and changed rows from the first database.

At stage 520, a second state information associated with the first database is maintained at the second database. For example, second state generator 320 maintains the second state information associated with the first database at the second database.

At stage 530, a synchronization error is detected based on the first and second state information, when a synchronization request is generated from a duplicated first database or an out of order synchronization request is generated from the first database based on a comparison of the first state information and the second state information. For example, error detector 330 detects the synchronization error for duplicated first database and out of order synchronization request.

In one embodiment, communications may fail at any stage of a synchronization and generate out of order communications. For example, events that lead to an out of order communication may occur in the following sequences:

(1) Client sends message #1 and experiences a communications failure.

(2) Client reconnects and asks the server if it received message #1, server replies "no."

(3) Server receives and processes delayed message #1. There may be many intermediate buffers in a complex network and message #1 may be delayed such that it was received after step (2) the second exchange (the question) from the client.

(4) Client resends message #1 a second time and the server processes it corrupting the data.

In an embodiment, error detector 330 detects out of order requests as described above, based on the comparison of the first and second state information.

In one embodiment, error detector 330 detects duplicated clients. For example, a system may make copies of the client data store. To ensure each message is only applied once, both the client and server maintain synchronization state information. Each client data store may a unique identifier that the server uses to track the state for that client. If a client data store is copied, two or more clients may be using the same identifier. Error detector 330 may detect the duplicated client identifiers to avoid data corruption or data loss.

At stage 540, upon a determination that a synchronization is free from synchronization error, the changed rows are applied between the first database and the second database, where the synchronization is performed in a non-chatty communication protocol. In an embodiment, the changed rows are synchronized between the first database and the second database with a message describing the changed rows since a last synchronization. Alternatively, the synchronization between the server and the client may be performed in the same fashion via a message describing the changed rows of the second database on the server since the last synchronization. In an embodiment, upon determination that the synchronization has synchronization error, the changed rows are discarded between the first database and the second database.

In an embodiment, a request is received from the first database for a status of a last synchronization, upon the first database determines that the first state information indicates a synchronization error between the first database and the second database in the last synchronization. In an embodiment, upon receiving a request for the status check, the server compares the first and second state information. For example, if PREV_SID=CLIENT_SID, the server responds to the client that the last message was not received and set the UPLOAD_APPLIED flag to be false. Alternatively, if CURR_SID=CLIENT_SID, the server responds that the last message was received and send the UPLOAD_APPLIED flag to true. Still alternatively, the server may send a MISMATCH ERROR indicating the server has detected that a duplicated copy of the data store was made.

In an embodiment, the first state information and second state information include unique identifiers (GUIDs) associated with the first database and session information.

In an embodiment, the first state information includes a unique identifier (GUID) associated with the first database, a current session identifier for a current communication session, a previous session identifier for a previous communication session, and a flag indicating whether a response has received from the second database communicating that a last message with the changed rows from the first database has been applied to the second database, where the previous session identifier and the current session identifier are unique identifiers (GUIDs) generated on the first database.

In one embodiment, given that at any point in the synchronization process, the communications link may break or the client/server may crash, the embodiment may handle these communication failures gracefully. For example, in the presence of synchronization errors, the state information representing the state of the client may be rolled back to the point of the last commit and the synchronization process pauses or terminates. The state values of the client database since last commit may further condition the next synchronization to correctly recover from the synchronization error. In an embodiment, the synchronization state may be committed atomically upon receiving the message from the other side. For example, if the data store is an RDBMS, the state information of the client data store may be committed in the same transaction that applies the message to the server consolidated store.

In an embodiment, the pseudo codes below illustrate the algorithm that the MSE operates:

The client initiates the communication from the client side:
  If CURR_SID=NULL then we proceed with a normal synchronization
    Set CURR_SID=new generated GUID value
  If there are requests to be uploaded
    Set LAST_UPLOAD_COMPLETE=FALSE
  Commit these changes to persistent storage
  The client opens a connection to the server (E.g. TCP/IP or HTTPS)
  The client sends its REMOTE_ID, PREV_SID & CURR_SID
  Client sends its message to the server In one embodiment, the message may include changed rows from the client RDBMS data store. In another embodiment, the message may include any type of request of synchronization between a first database and a second database. In still another embodiment, the client may upload other information such as security credentials to the server. In still another embodiment, it is possible that the upload may contain empty information such as containing no requests originated from the client.

In response to the communication from the client, the followings occur on the server side:
  The upload stream is received from the remote client on the server side
  The server uses the uploaded REMOTE_ID to load the appropriate state for that client
    If the server does not have any state for the REMOTE_ID then values are initialized to NULL
    If the uploaded PREV_SID==CLIENT_SESSION_ID OR PREV_SID=
  NULL OR CLIENT_SESSION_ID=NULL
  If the above conditions are met, then state information is consistent between the client and the server and the synchronization can continue:
    Set CLIENT_SESSION_ID=CURR_SID
    Set CLIENT_UPLOAD_APPLIED=FALSE
    Commit the new state
    Process any requests in the upload.
    If the upload was processed successfully
    Set UPLOAD_APPLIED=TRUE
    Otherwise rollback any changes made
    Commit the changes to UPLOAD_APPLIED as well as the results of the clients request
  The server now generates its response to the client, upon the commit of the client message:
    The server sends its UPLOAD_APPLIED flag
    The server can also add its own set of requests to be applied to the client In one embodiment, the tracking mechanism may be applied to ensure the robustness of the downloaded requests and they are independent from each other to minimize interference.

Upon receiving the response from the server, the following operations occur on the client:
  Set PREV_SID=CURR_SID
  Set CURR_SID=NULL
  These changes are committed
  The client receives the UPLOAD_APPLIED flag
  The client updates its local state information to reflect whether the upload was applied or rejected
  Set LAST_UPLOAD_COMPLETE=TRUE
  These changes are committed
  The client then processes any requests sent from the server and commits the changes
  Synchronization is complete In the event that an error condition arises, the followings occur on the client side:
  Otherwise if PREV_SID doesn't match what is expected between the state information on the client and the server (the PREV_SID does not match the CLIENT_SESSION_ID), an error condition is generated
  The server indicates that the remote data store has been copied or that requests have been received out of order
  The server sends a MISMATCH error response to the client In one embodiment, when messages are received out of order, this indicates that the communications link is broken. The server may receive a network error when it attempts to send the message to the client.

The followings occur on the client side when the client receives the MISMATCH error message:
  The client updates its local state information to reflect whether that the upload was rejected
  Set LAST_UPLOAD_COMPLETE=TRUE
  Changes are committed
  Report the error to the application In some embodiments, there are options on how to handle the synchronization errors:
(1) The remote application may generate a new REMOTE_ID so it can synchronize with a new identity
(2) An IT administrator may correct the state information stored in the server to allow synchronization to proceed
(3) If the data stored in the remote data store can easily be re-created (E.g. re-downloaded), the application may generate a new blank remote data store.
  Synchronization is complete
  Otherwise (CURR_SID !=NULL)

This may indicate the fate of the last upload has not been resolved due to a communications error, so the client does a status-check:
  The client sends REMOTE_ID, PREV_SID, CURR_SID to the server and requests a status check Upon receiving a request for the status check, the followings occur on the server:
  If PREV_SID=CLIENT_SID, then respond to the client that the message was not received and send false in place of the UPLOAD_APPLIED flag
  Otherwise if CURR_SID=CLIENT_SID then respond that the message was received and send the UPLOAD_APPLIED flag
  Otherwise, send a MISMATCH ERROR indicating the server has detected that a copy of the data store was made Subsequently, the followings occur on the client:
  Read the response from the server
  If MISMATCH then pass the error back to the application.
  Otherwise, process the UPLOAD_APPLIED flag
  The client updates its local state information to reflect whether the upload was applied or rejected
  The status check is complete, if there is no MISMATCH, the client proceeds to do a regular synchronization.

Embodiments shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
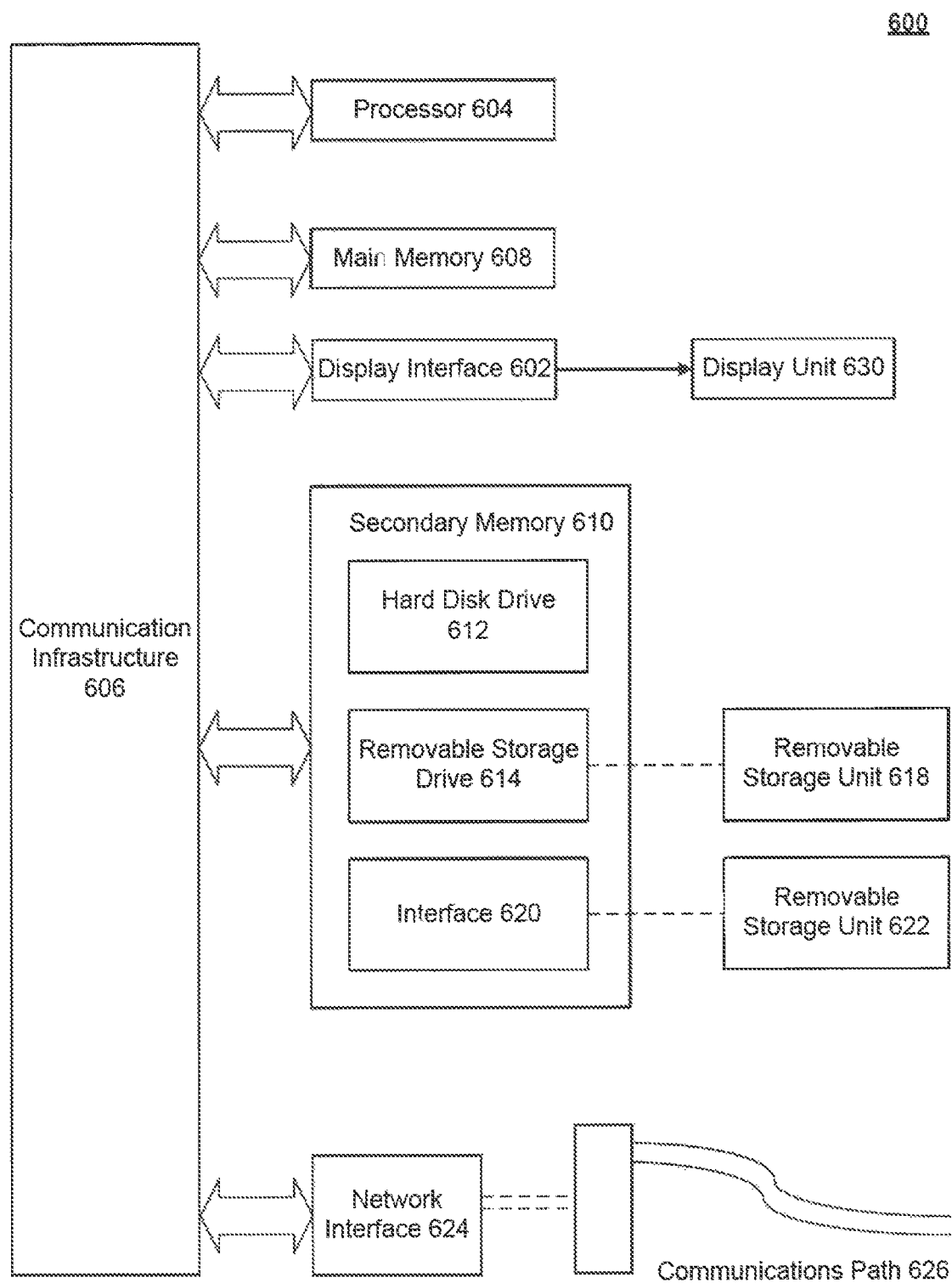
FIG. 6 is a diagram of an example computer system in which embodiments can be implemented.

FIG. 6 illustrates an example computer system 600 in which embodiments, or portions thereof, may be implemented as computer-readable code. For example, MSE 115 and 125, including their components, as shown in FIGS. 2 and 3, can be implemented in computer system 600 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 800. After reading this description, it will become apparent to a person skilled in the relevant art how to implement embodiments of the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an-optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a network interface 624. Network interface 624 allows software and data to be transferred between computer system 600 and external devices. Network interface 624 may include a modem, a network interface (such as an Ethernet card), a communications port, a PCMCIA slot and card, or the like. Software and data transferred via network interface 624 may be in the form of signals, which may be electronic, electromagnetic, optical, or other signals capable of being received by network interface 624. These signals may be provided to network interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via network interface 624. Such computer programs, when executed, enable computer system 600 to implement embodiments as discussed herein. In particular, the computer programs, when executed, enable processor device 604 to implement the processes of embodiments of the present invention, such as the stages in the methods illustrated by flowcharts 400 and 500 of FIGS. 4 and 5, discussed above. Accordingly, such computer programs represent controllers of the computer system 600. Where embodiments are implemented using software, the software may be stored in a computer program product and loaded into computer system 600 using removable storage drive 614, interface 620, and hard disk drive 612, or network interface 624.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for synchronization between a first database and a second database, comprising:
    maintaining first state information associated with the first database at the first database, the first state information including a current session identifier representing a current communication session between the first database and the second database and a previous session identifier representing a previous communication session between the first database and the second database, wherein second state information associated with the first database is maintained at the second database, the second state information including a session identifier associated with either the current communication session or the previous communication session based on whether the current communication session is in progress between the first database and the second database;
    sending, to the second database, a message including the first state information and changed rows, within the current communication session, between the first database and the second database since a last synchronization of the previous communication session;
    receiving, from the second database, a status of the last synchronization, wherein the status indicates whether a synchronization error is detected, and wherein the synchronization error is generated when a synchronization request is received at the second database from a duplicated first database, and the synchronization error is detected by the second database based on a comparison of the previous session identifier, from the first state information, with the current session identifier, from the second state information; and
    without waiting for a response from the second database, applying, based on the message, the changed rows between the first database and the second database upon determining that the status is free from the synchronization error.

2. The method of claim 1, wherein the second database updates the session identifier to be the current session ID responsive to determining that the status is synchronization-error free.

3. The method of claim 1, wherein the changed rows are discarded upon determining that the status indicates the synchronization error, wherein the status indicates a synchronization error upon the second database determining that the previous session identifier and the session identifier are mismatched.

4. The method of claim 1, further comprising:
    upon determining that the first state information indicates the synchronization error between the first database and the second database in the last synchronization, sending a request to the second database to obtain a status of the last synchronization.

5. The method of claim 1, wherein the first database is an embedded data store on a client, and the second database is a consolidated data store.

6. The method of claim 1, wherein the first database and the second database engage in peer to peer communication.

7. The method of claim 1, wherein the first state information includes a unique identifier (GUID) associated with the first database, and a flag indicating whether a response was received from the second database communicating that a last message with the changed rows from the first database has been applied to the second database, wherein the previous session identifier and the current session identifier are unique identifiers (GUIDs) generated on the first database.

8. The method of claim 1, wherein the second state information includes the unique identifier (GUID) associated with the first database and a flag indicating whether a last message with the changed rows from the first database has been applied to the second database in the communication session represented by the session identifier, wherein the session identifier is a unique identifier (GUID) generated on the first database and transmitted to the second database.

9. The method of claim 1, further comprising:
    generating the synchronization error when an out of order synchronization request is generated from the first database, wherein the status indicates the synchronization error responsive to the comparison indicating that the previous session identifier and the session identifier are mismatched.

10. A method for synchronization between a first database and a second database, comprising:
    receiving, from the first database, a message including changed rows, within a current communication session, between the first database and the second database since a last synchronization of a previous communication session and first state information associated with the first database, the first state information including a current session identifier representing the current communication session between the first database and the second database and a previous session identifier representing the previous communication session between the first database and the second database;

maintaining second state information associated with the first database at the second database, the second state information including a session identifier associated with either the current communication session or the previous communication session based on whether the current communication session is in progress between the first database and the second database;

detecting a synchronization error that is generated when a synchronization request at the second database is received from a duplicated first database, the detecting being based on a comparison of the previous session identifier, from the first state information, with the current session identifier, from the second state information;

responsive to the comparison, sending a status of the last synchronization to the first database, the status indicating whether the synchronization error is detected; and without waiting for a response from the second database, applying, based on the message, the changed rows between the first database and the second database upon determining that the status is free from the synchronization error.

11. The method of claim 10, further comprising:

detecting the synchronization error upon determining that the previous session identifier and the session identifier are mismatched; and upon detecting the synchronization error, discarding the changed rows between the first database and the second database.

12. The method of claim 10, further comprising:

receiving a request from the first database for a status of the last synchronization, upon the first database determining that the first state information indicates the synchronization error between the first database and the second database in the last synchronization.

13. The method of claim 8, wherein the first state information and second state information include unique identifiers (GUIDs) associated with the first database and session information.

14. The method of claim 8, wherein the first state information includes a unique identifier (GUID) associated with the first database and a flag indicating whether a response was received from the second database communicating that a last message with the changed rows from the first database has been applied to the second database, wherein the previous session identifier and the current session identifier are unique identifiers (GUIDs) generated on the first database.

15. A system for synchronization between a first database and a second database, comprising:

a first state generator, configured to maintain first state information associated with the first database at the first database, the first state information including a current session identifier representing a current communication session between the first database and the second database and a previous session identifier representing a previous communication session between the first database and the second database, wherein second state information associated with the first database is maintained at the second database, the second state information including a session identifier associated with either the current communication session or the previous communication session based on whether the current communication session is in progress between the first database and the second database;

a message sender, configured to send, to the second database, a message including the first state information and changed rows, within the current communication session, between the first database and the second database since a last synchronization of the previous communication session;

a status receiver, configured to receive, from the second database, a status of the last synchronization, wherein the status indicates whether a synchronization error is detected, and wherein the synchronization error is generated when a synchronization request is received at the second database from a duplicated first database, and the synchronization error is detected by the second database based on a comparison of the previous session identifier, from the first state information, with the current session identifier, from the second state information; and without waiting for a response from the second database, applying, based on the message, the changed rows between the first database and the second database upon determining that the status is free from the synchronization error.

16. The system of claim 15, wherein the second database updates the session identifier to be the current session ID responsive to determining that the status is synchronization-error free.

17. The system of claim 15, wherein the changed rows are discarded upon determining that the status indicates the synchronization error, wherein the status indicates the synchronization error upon the second database determining that the previous session identifier and the session identifier are mismatched.

18. The system of claim 15, further comprising:

a status requestor, configured to send a request to the second database to obtain a status of the last synchronization, upon determining that the first state information indicates the synchronization error between the first database and the second database in the last synchronization.

19. A system for synchronization between a first database and a second database, comprising:

a message receiver, configured to receive, from the first database, a message including changed rows, within a current communication session, between the first database and the second database since a last synchronization of a previous communication session and first state information associated with the first database, the first state information including a current session identifier representing the current communication session between the first database and the second database and a previous session identifier representing the previous communication session between the first database and the second database;

a state generator, configured to maintain second state information associated with the first database at the second database, the second state information including a session identifier associated with either the current communication session or the previous communication session based on whether the current communication session is in progress between the first database and the second database;

an error detector, configured to detect a synchronization error that is generated when a synchronization request is received at the second database from a duplicated first database which is based on a comparison of the previous session identifier, from the first state information, with the current session identifier, from the second state information; and a data updater, configured to apply, based on the message, the changed rows between the first database and the second database upon the error detector detecting no synchronization error and without waiting for a response from the second database.

20. The system of claim 19, further comprising a data discarder, configured to discard the changed rows between the first database and the second database upon the error detector detecting the synchronization error.

21. A non-transitory computer readable storage medium having instructions encoded thereon, execution of which, by a processor, cause the processor to perform operations comprising:

maintaining first state information associated with the first database at the first database, the first state information including a current session identifier representing a current communication session between the first database and the second database and a previous session identifier representing a previous communication session between the first database and the second database, wherein second state information associated with the first database is maintained at the second database, the second state information including a session identifier associated with either the current communication session or the previous communication session based on whether the current communication session is in progress between the first database and the second database;

sending, to the second database, a message including the first state information and changed rows, within the current communication session, between the first database and the second database since a last synchronization of the previous communication session;

receiving, from the second database, a status of the last synchronization, wherein the status indicates whether a synchronization error is detected, and wherein the synchronization error is generated when a synchronization request is received at the second database from a duplicated first database, and the synchronization error is detected by the second database based on a comparison of the previous session identifier, from the first state information, with the client session identifier, from the second state information; and without waiting for a response from the second database, applying the changed rows between the first database and the second database upon determining that the status is free from the synchronization error.

22. The method of claim 10, further comprising:

updating the session identifier to be the current session ID responsive to the detecting of no synchronization error.

* * * * *